United States Patent
Hsu

(10) Patent No.: US 9,391,454 B2
(45) Date of Patent: Jul. 12, 2016

(54) APPARATUS AND METHOD FOR POWER SUPPLY FAST DISCHARGING

(71) Applicant: FSP TECHNOLOGY INC., Taoyuan County (TW)

(72) Inventor: Chien-Lung Hsu, Taoyuan County (TW)

(73) Assignee: FSP TECHNOLOGY INC., Taoyuan (TW)

( * ) Notice: Subject to any disclaimer, the term of this patent is extended or adjusted under 35 U.S.C. 154(b) by 440 days.

(21) Appl. No.: 13/944,884

(22) Filed: Jul. 18, 2013

(65) Prior Publication Data

US 2014/0021784 A1    Jan. 23, 2014

(30) Foreign Application Priority Data

Jul. 18, 2012  (TW) ............................. 101125877 A

(51) Int. Cl.
*H02J 1/00* (2006.01)
*H02J 9/06* (2006.01)

(52) U.S. Cl.
CPC . *H02J 1/00* (2013.01); *H02J 9/061* (2013.01); *Y10T 307/344* (2015.04)

(58) Field of Classification Search
CPC .................... H02J 1/00; H02J 9/061
USPC ...................................... 307/23, 64
See application file for complete search history.

(56) References Cited

U.S. PATENT DOCUMENTS

| 5,140,511 A * | 8/1992 | Lee ................. H02H 7/12 323/299 |
| 5,646,514 A * | 7/1997 | Tsunetsugu ......... H02M 7/2176 323/285 |
| 2012/0161522 A1* | 6/2012 | Nam ....................... H02J 9/005 307/64 |
| 2013/0076139 A1* | 3/2013 | Hu ............................ H02J 9/06 307/64 |

* cited by examiner

*Primary Examiner* — Jared Fureman
*Assistant Examiner* — James P Evans
(74) *Attorney, Agent, or Firm* — Jianq Chyun IP Office

(57) ABSTRACT

An apparatus and a method for power supply are provided. In the invention, the residual standby power can be quickly discharged by an additional fast discharging unit within a predetermined time when an external AC power (for example, city power) received by the power supply apparatus capable of supporting ATX (Advanced Technology eXtended) specification is unavailable (for example, power trip). Accordingly, any host system applied with the inventive power supply apparatus and method would not be inoperable when the received external AC power (city power) is recovered, and thus effectively promoting the stability of the applied host system.

21 Claims, 3 Drawing Sheets

APPARATUS AND METHOD FOR POWER SUPPLY FAST DISCHARGING

CROSS-REFERENCE TO RELATED APPLICATION

The present invention relates to a power supply technology, more particularly, to a power supply apparatus and a power supply method both capable of supporting an Advanced Technology eXtended (ATX) specification

BACKGROUND OF THE INVENTION

1. Field of the Invention

The present invention relates to a power supply technology, more particularly, to a power supply apparatus and a power supply method both capable of supporting an advanced technology extended (ATX) specification.

2. Description of the Related Art

As computer system has increasingly been used, power consumption has increased accordingly. In this regard, a power management mechanism (so-called Advanced Configuration and Power Interface specification, ACPI specification) has been used to manage the power of the computer system. Based on the power management mechanism of ACPI specification, the statuses of whole computer system would be classified into six statuses (S0 to S5) with different power consumption levels.

In a computer system with the power management mechanism of ACPI specification, the power supply apparatus thereof would be capable of supporting a kind of power supply mechanism with Advanced Technology eXtended (ATX) specification and including a set of main powers (+12V, +5V, +3.3V, −12V, −5V) and a standby power (5Vsb or 12Vsb). When the external AC power (i.e. city power) is supplied or inputted to the power supply apparatus capable of supporting ATX specification, the power supply apparatus capable of supporting ATX specification would continuously generate and output the standby power, so as to supply the standby power to the power management controller in the computer system.

However, in the actual practice or application, when the city power is unavailable (for example, power trip), the standby power (+5Vsb or +12Vsb) cannot be fully released or discharged within a predetermined time (for example, 500 ms). In this case, when the city power is recovered (i.e. short outage first and then outage restoration), the power management controller (e.g. power IC) in the computer system would generate a conflict error (for example, the power IC is not reset by an additional signal when the working voltage received by the power IC is changed from the higher normal level to the lower abnormal level), and the computer system would thus be inoperable.

Accordingly, the present invention is directed to a power supply apparatus and a power supply method both capable of supporting an Advanced Technology eXtended (ATX) specification, so as to improve or resolve the problem mentioned in the "Description of the Related Art".

An exemplary embodiment of the present invention provides a power supply apparatus. The power supply apparatus includes an input conversion stage, a standby power generation unit and a fast discharging unit. The input conversion stage is configured to receive an external AC power, and convert the external AC power to output a DC input voltage. The standby power generation unit is coupled to the output of the input conversion stage, and configured to convert the DC input voltage to generate and output a standby power. The fast discharging unit is coupled to the standby power generation unit, and configured to fast discharge the standby power within a first predetermined time when the external AC power is unavailable, so as to disable the standby power.

In an exemplary embodiment of the present invention, the fast discharging unit includes a first and a second Zener diodes, a first to a third resistors, and a first and a second bipolar-junction-transistors (BJTs). A cathode of the first Zener diode is configured to receive the standby power, and a cathode of the second Zener diode is coupled to an anode of the first Zener diode. A first terminal of the first resistor is coupled to an anode of the second Zener diode, and a second terminal of the first resistor is coupled to a ground potential. A first terminal of the second resistor is coupled to the cathode of the first Zener diode, and a first terminal of the third resistor is also coupled to the cathode of the first Zener diode. A base of the first BJT is coupled to the first terminal of the first resistor, a collector of the first BJT is coupled to a second terminal of the second resistor, and an emitter of the first BJT is coupled the ground potential. A base of the second BJT is coupled to the second terminal of the second resistor, a collector of the second BJT is coupled to a second terminal of the third resistor, and an emitter of the second BJT is coupled the ground potential.

In an exemplary embodiment of the present invention, the fast discharging unit may further include a first and a second capacitors. A first terminal of the first capacitor is coupled to the base of the first BJT, and a second terminal of the first capacitor is coupled to the ground potential. A first terminal of the second capacitor is coupled to the base of the second BJT, and a second terminal of the second capacitor is coupled to the ground potential.

In an exemplary embodiment of the present invention, the first and the second BJTs are NPN-type BJTs.

In an exemplary embodiment of the present invention, the first BJT is conducted only when the standby power is established, and the second BJT is conducted only when the standby power is not established.

In an exemplary embodiment of the present invention, a resistance of the third resistor is substantially smaller than that of the second resistor.

In an exemplary embodiment of the present invention, the provided power supply apparatus may further include a main power conversion unit. The main power conversion unit is coupled to the input conversion stage, and configured to convert the DC input voltage to generate and output a set of main powers after the standby power is generated and when the power supply apparatus is in an operation phase.

In an exemplary embodiment of the present invention, the provided power supply apparatus is a power supply apparatus capable of supporting an Advanced Technology eXtended (ATX) specification.

Another exemplary embodiment of the present invention provides a power supply method. The power supply method includes: converting an external AC power, so as to provide a DC input voltage; converting the DC input voltage, so as to generate and output a standby power; and fast discharging the standby power within a first predetermined time when the external AC power is unavailable, so as to disable the standby power.

In an exemplary embodiment of the present invention, the provided power supply method is at least applicable to a power supply apparatus capable of supporting an Advanced Technology eXtended (ATX) specification, and after the standby power is generated, the power supply method may further include: determining whether the power supply apparatus is in an operation phase; if yes, converting the DC input voltage, so as to generate and provide a set of main powers; and if no, continuously converting the external AC power, so as to keep providing the standby power.

In an exemplary embodiment of the present invention, after the set of main powers is generated, the power supply method may further include: determining whether the external AC power is unavailable; if yes, fast discharging the standby power within the first predetermined time, so as to disable the standby power; and if no, continuously converting the external AC power, so as to keep providing the standby power and the set of main powers.

In an exemplary embodiment of the present invention, after the standby power is disabled, the power supply method may further include: determining whether the external AC power is unavailable again; if yes, continuously disabling the standby power; and if no, converting the external AC power again, so as to keep providing the standby power, and continuously determining whether the external AC power is unavailable again after the set of main powers is generated again, and thus determining whether to disable the standby power again.

In an exemplary embodiment of the above present invention, the set of main powers is continuously maintained and outputted for more than a second predetermined time after the external AC power is unavailable.

In an exemplary embodiment of the above present invention, the second predetermined time is smaller than the first predetermined time.

Another exemplary embodiment of the invention provides a power supply apparatus. The power supply apparatus includes a standby power generation unit and a fast discharging unit. The standby power generation unit is configured to convert a DC input voltage relating to an external AC power, so as to generate and output a standby power. The fast discharging unit is coupled to the standby power generation unit, and configured to fast discharge the standby power within a first predetermined time when the external AC power is unavailable, so as to disable the standby power.

From the above, in the invention, the residual standby power can be quickly discharged by an additional fast discharging unit within a predetermined time when an external AC power (for example, city power) received by the power supply apparatus capable of supporting ATX (Advanced Technology Extended) specification is unavailable (for example, power trip). Accordingly, any host system (for example, computer system, but not limited thereto) applied with the inventive power supply apparatus and method would not be inoperable when the received external AC power (city power) is recovered, and thus not only effectively improving/resolving the problem mentioned in the "Description of the Related Art", but also effectively promoting the stability of the applied host system.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
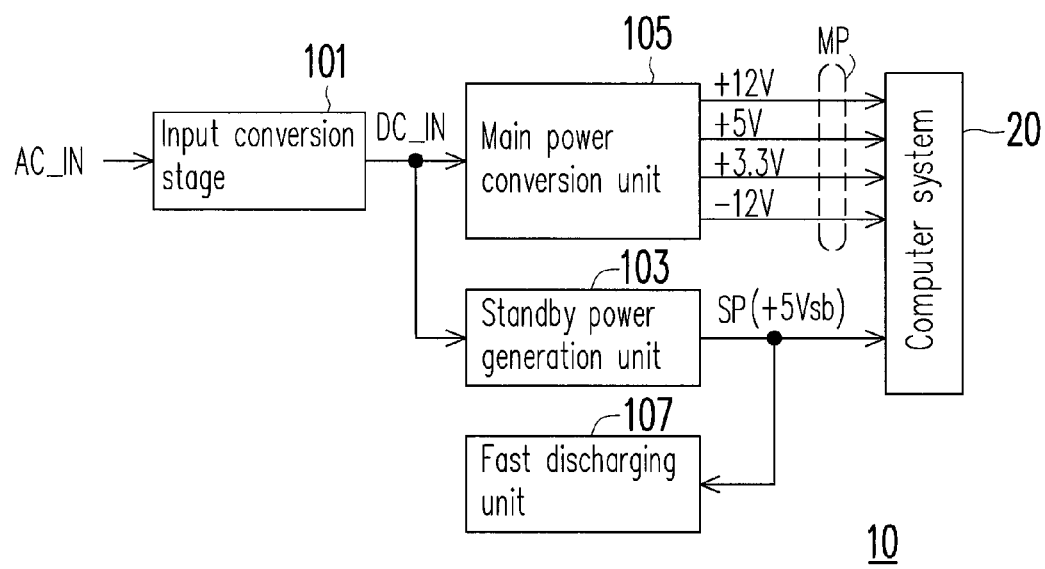
FIG. 1 is a diagram of a power supply apparatus 10 capable of supporting Advanced Technology Extended (ATX) specification according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a power supply apparatus 10 capable of supporting Advanced Technology eXtended (ATX) specification according to an exemplary embodiment of the present invention. Referring to FIG. 1, the power supply apparatus 10 capable of supporting ATX specification includes an input conversion stage 101, a standby power generation unit 103, a main power conversion unit 105, and a fast discharging unit 107.

In the exemplary embodiment, the input conversion stage 101 is configured to receive an external AC power AC_IN (for example, the city power, but not limited thereto), and convert (i.e. AC-to-DC conversion) the received external AC power AC_IN, so as to output a DC input voltage DC_IN.

The standby power generation unit 103 is coupled to the output of the input conversion stage 101, and configured to convert (i.e. DC-to-DC conversion) the DC input voltage DC_IN output from the input conversion stage 101, so as to generate and output a standby power SP (for example, +5Vsb, but not limited thereto) to a power management controller (not shown) in, for example, but not limited thereto, a computer system 20.

In the exemplary embodiment, regardless of the power supply apparatus 10 being in an operation phase or in a standby phase, as long as the external AC power AC_IN is inputted to the power supply apparatus 10, the standby power generation unit 103 would continuously generate and output the standby power SP (+5Vsb) to the power management controller of the computer system 20 in response to the DC input voltage DC_IN output from the input conversion stage 101, until the external AC power (city power) AC_IN received by the input conversion stage 101 is unavailable (for example, power trip, but not limited thereto).

The main power conversion unit 105 is coupled to the input conversion stage 101, and configured to convert (i.e. DC-to-DC conversion) the DC input voltage DC_IN output from the input conversion stage 101 after the standby power SP is generated and when the power supply apparatus 10 is in an operation phase, so as to generate and output a set of main powers MP to the computer system 20. In the exemplary embodiment, the set of main powers MP may include +12V, +5V, +3.3V, −12V, but not limited thereto.

The fast discharging unit 107 is coupled to the standby power generation unit 103, and configured to fast discharge the standby power SP within a first predetermined time (for example, 500 ms, but not limited thereto) when the external AC power AC_IN is unavailable (for example, the city power is tripped, but not limited thereto), so as to disable or inactivate the standby power SP. In other words, when the city power is tripped, the fast discharging unit 107 can fully release or discharge the residual standby power SP of the standby power generation unit 103 within 500 ms.

On the other hand, for the power supply apparatus 10 capable of supporting ATX specification, the set of main powers MP (+12V, +5V, +3.3V, −12V) generated by the main power conversion unit 105 would be continuously maintained and outputted for more than a second predetermined time (for example, 17 ms, but not limited thereto) after the external AC power AC_IN is unavailable, where the second predetermined time is so-called "hold-up time". Obviously, the above-mentioned second predetermined time (17 ms) would be substantially smaller than the above-mentioned first predetermined time (500 ms).

Referring back to the contents recited in the "Description of the Related Art", in the actual practice or application, when the city power is unavailable (for example, power trip), the standby power (+5Vsb) cannot be fully released or discharged within a predetermined time (for example, 500 ms). In this case, when the city power is recovered (i.e. short outage first and then outage restoration), the power management controller (e.g. power IC) in the computer system would generate a conflict error, and the computer system would thus be in crash inoperable.

Accordingly, in order to effectively improve/resolve the problem mentioned in the "Description of the Related Art", in the exemplary embodiment, the fast discharging unit 107 is additionally configured in the power supply apparatus 10 capable of supporting ATX specification, such that when the city power is tripped, the fast discharging unit 107 is used or employed to fully release or discharge the residual standby power SP of the standby power generation unit 103 within 500 ms. Hence, the computer system 20 would not be inoperable when the external AC power (city power) AC_IN is recovered (i.e. short outage first and then outage restoration).

Figure 2:
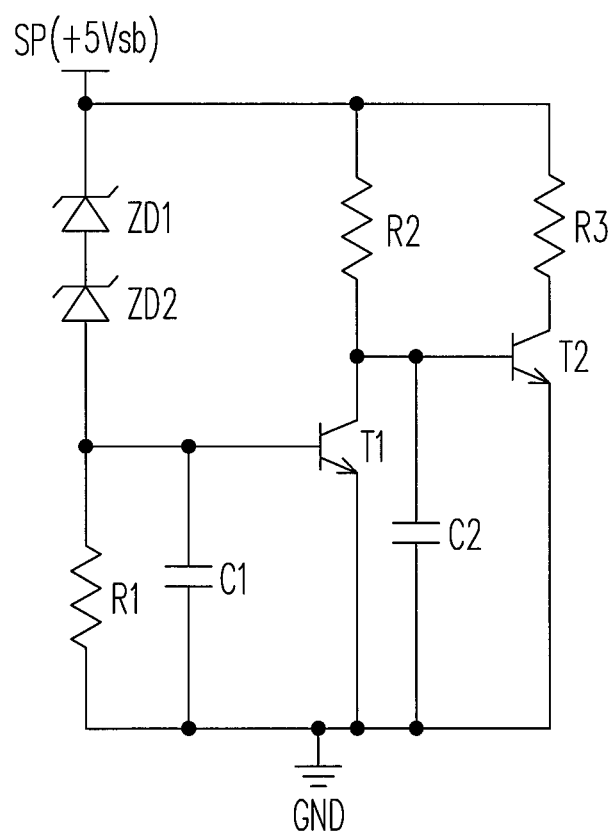

To be specific, FIG. 2 is a circuit diagram of a fast discharging unit 107 of FIG. 1. Referring to FIGS. 1 and 2, the fast discharging unit 107 includes Zener diodes (ZD1, ZD2), resistors (R1 to R3), BJTs (bipolar-junction-transistors) (T1, T2), and capacitors (C1, C2).

In the exemplary embodiment, the cathode of the Zener diode ZD1 is configured to receive the standby power SP (+5Vsb), and the cathode of the Zener diode ZD2 is coupled to the anode of the Zener diode ZD1. The first terminal of the resistor R1 is coupled to the anode of the Zener diode ZD2, and the second terminal of the resistor R1 is coupled to a ground potential GND. The first terminal of the resistor R2 is coupled to the cathode of the Zener diode ZD1, and the first terminal of the resistor R3 is also coupled to the cathode of the Zener diode ZD1. The resistance of the resistor R3 may be substantially smaller than that of the resistor R2. For example, the resistance of the resistor R3 may be substantially smaller, such as several tens of ohms (Ω). Moreover, the resistance of the resistor R2 may be substantially greater the better, such as several kilo-ohms (KΩ), but not limited thereto, so as to avoid affecting the standby efficiency of the power supply apparatus 10 and thus improving the whole efficiency of standby. How to design the resistances of the resistors R2 and R3 will be explained later.

The BJTs T1 and T2 may be NPN-type BJTs. In this case, the base of the BJT T1 is coupled to the first terminal of the resistor R1, the collector of the BJT T1 is coupled to the second terminal of the resistor R2, and the emitter of the BJT T1 is coupled the ground potential GND. The base of the BJT T2 is coupled to the second terminal of the resistor R2, the collector of the BJT T2 is coupled to the second terminal of the resistor R3, and the emitter of the BJT T2 is coupled the ground potential GND.

The first terminal of the capacitor C1 is coupled to the base of the BJT T1, and the second terminal of the capacitor C1 is coupled to the ground potential GND. In other words, the capacitor C1 is coupled between the base of the BJT T1 and the ground potential GND. Similarly, the first terminal of the capacitor C2 is coupled to the base of the BJT T2, and the second terminal of the capacitor C2 is coupled to the ground potential GND. In other words, the capacitor C2 is coupled between the base of the BJT T2 and the ground potential GND.

During the operation the fast discharging unit 107, the BJT T1 is conducted only when the standby power SP is established. In general, the standby power SP can be seen as being established when the level of the standby power SP reaches to more than 0.95 of predetermined standby power. For example, the standby power SP can be seen as being established when the level of the standby power SP reaches to more than +4.75V (i.e. +5V*0.95), but not limited thereto. On the other hand, the BJT T2 is conducted only when the standby power SP is not established. For example, the standby power SP can be seen as being not established yet when the level of the standby power SP is lower than +4.75V, but not limited thereto. Furthermore, the Zener diodes (ZD1, ZD2) would be in breakdown only when the level of the standby power SP is higher than +4.75V.

In the exemplary embodiment, when the external AC power (city power) AC_IN received by the power supply apparatus 10 is in normal, regardless of the power supply apparatus 10 being in the operation phase or in the standby phase, the standby power generation unit 103 would continuously generate and output the standby power SP (+5Vsb) to the power management controller of the computer system 20 in response to the DC input voltage DC_IN output from the input conversion stage 101. However, in the same case or condition, only when the power supply apparatus 10 is in the operation phase, the main power conversion unit 105 would generate and output the set of main powers (+12V, +5V, +3.3V, −12V) to the computer system 20 in response to the DC input voltage DC_IN output from the input conversion stage 101.

During the standby power generation unit 103 generates the standby power SP (+5Vsb), once the level of the standby power SP (+5Vsb) is lower than +4.75V, the standby power SP can be seen as being not established yet. Accordingly, since the Zener diodes (ZD1, ZD2) would not be in breakdown, so the BJTs (T1, T2) in the fast discharging unit 107 would respectively be turned-off and turned-on. At the time, the fast discharging unit 107 can be seen as being activated or enabled, and the resistor R3 in the fast discharging unit 107 can be seen as a dummy load for the standby power generation unit 103.

On the other hand, during the standby power generation unit 103 generates the standby power SP (+5Vsb), once the level of the standby power SP (+5Vsb) is higher than +4.75V, the standby power SP can be seen as being established. Accordingly, since the Zener diodes (ZD1, ZD2) would be in breakdown, so the BJTs (T1, T2) in the fast discharging unit 107 would respectively be turned-on and turned-off. At the time, the fast discharging unit 107 can be seen as being inactivated or disabled, but since the resistance of the resistor R2 in the fast discharging 107 is bigger, so the whole fast discharging unit 107 would not result in generating too much additional power consumption. Here, this is a reason that the resistance of the resistor R2 may be substantially greater the better.

Contrary, when the external AC power (city power) received by the power supply apparatus 10 is unavailable (for example, power trip, but not limited thereto), regardless of the power supply apparatus 10 being in the operation phase or in the standby phase, the standby power SP (+5Vsb) generated by the standby power generation unit 103 reduces as the DC input voltage DC_IN output from the input conversion stage 101 reduces.

Once the level of the standby power SP (+5Vsb) is lower than +4.75V, the standby power SP (+5Vsb) can also be seen as being not established yet. Accordingly, since the Zener diodes (ZD1, ZD2) would not be in breakdown, so the BJTs (T1, T2) in the fast discharging unit 107 would respectively be turned-off and turned-on. At the time, the fast discharging unit 107 can also be seen as being activated or enabled, but since the resistance of the resistor R3 in the fast discharging unit 107 is smaller, so the whole power consumption of the fast discharging unit 107 would be increased, so as to fast or quickly consume the residual standby power SP of the standby power generation unit 103, and thus achieving the purpose of fast discharging the standby power SP. Here, this is a reason that the resistance of the resistor R3 may be substantially smaller.

It is known that when the external AC power (city power) AC_IN received by the power supply apparatus 10 is unavailable (for example, power trip, but not limited thereto), the fast discharging unit 107 would immediately provide a load discharge path with lower resistance, so as to fast or quickly discharge or release the residual standby power SP of the standby power generation unit 103 within 500 ms. In other words, when the external AC power (city power) is tripped, the fast discharging unit 107 can fully release or discharge the residual standby power SP of the standby power generation unit 103 within 500 ms. Accordingly, the computer system 20 would not be inoperable when the external AC power (city power) AC_IN is recovered (i.e. short outage first and then outage restoration).

Figure 3:
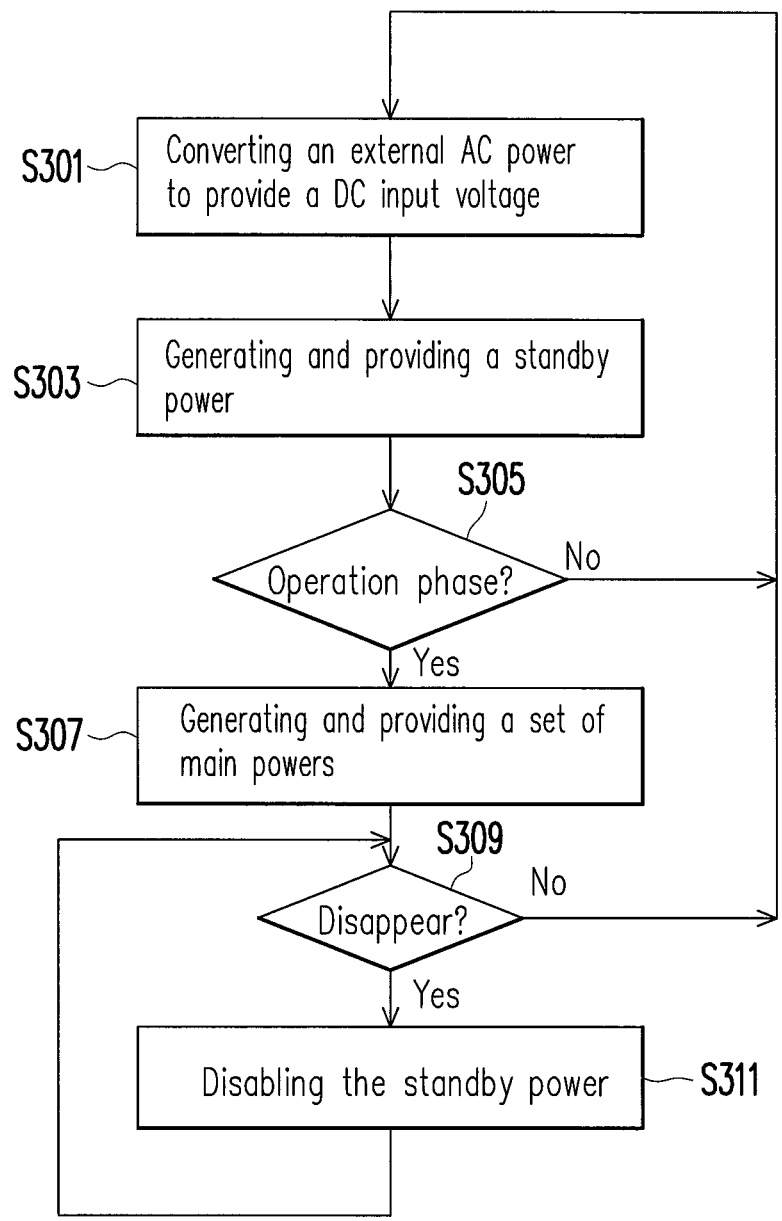
FIG. 3 is a flow chart of a power supply method according to an exemplary embodiment of the present invention.

From the teachings of the above exemplary embodiments, FIG. 3 is a flow chart of a power supply method according to an exemplary embodiment of the present invention. Referring to FIG. 3, the power supply method of the exemplary embodiment is at least applicable to a power supply apparatus capable of supporting an Advanced Technology eXtended (ATX) specification, but not limited thereto. The power supply method of the exemplary embodiment includes the following steps.

Converting an external AC power (for example, city power), so as to provide a DC input voltage (Step S301).

Converting the DC input voltage, so as to generate and output a standby power (for example, +5Vsb) (Step S303).

After the standby power is generated, determining whether the power supply apparatus supporting ATX specification is in an operation phase (Step S305). If determining that the power supply apparatus supporting ATX specification is in the operation phase, converting the DC input voltage, so as to generate and provide a set of main powers (for example, +12V, +5V, +3.3V, −12V) (Step S307); otherwise, if determining that the power supply apparatus supporting ATX specification is not in the operation phase (i.e. in the standby phase/state), continuously converting the external AC power, so as to keep providing the standby power (+5Vsb).

After the set of main powers is generated, determining whether the external AC power is unavailable (for example, power trip, but not limited thereto) (Step S309). If determining that the external AC power is unavailable, fast discharging the standby power within a first predetermined time (for example, 500 ms, but not limited thereto), so as to disable the standby power (Step S311); otherwise, if determining that the external AC power is available, continuously converting the external AC power, so as to keep providing the standby power and the set of main powers. It is noted that the generated set of main powers should be continuously maintained and outputted for more than a second predetermined time (for example, more than 17 ms, but not limited thereto) after the external AC power is unavailable. Obviously, the aforementioned second predetermined time is smaller than the aforementioned first predetermined time.

After the standby power is disabled, returning back to the Step S309 to determine whether the external AC power is unavailable again. If determining again that the external AC power is unavailable, continuously disabling the standby power as the Step S311; otherwise, if determining that the external AC power is available, for example, the external AC power is recovered (i.e. short outage first and then outage restoration), returning back to the Step S301 to convert the external AC power again, so as to keep providing the standby power, and continuously determining whether the external AC power is unavailable again after the set of main powers is generated again, and thus determining whether to disable the standby power again.

In summary, in the invention, when the external AC power (for example, city power) received by the power supply apparatus capable of supporting ATX specification is unavailable (for example, power trip), the residual standby power can be quickly discharged by an additionally-configured fast discharging unit within a predetermined time (for example, 500 ms). Accordingly, the computer system applied with the inventive power supply apparatus and method would not be inoperable when the received external AC power (city power) is recovered (i.e. short outage first and then outage restoration), and thus not only effectively improving/resolving the problem mentioned in the "Description of the Related Art", but also effectively promoting the stability of the applied computer system.

It is noted that even though the computer system is taken as an example for explaining and illustrating in the above exemplary embodiments, but the invention is not limited thereto. To be specific, the inventive power supply apparatus and method can be applicable to any host system with a power supply mechanism having a set of main powers and a standby power, so the application occasion of the inventive power supply apparatus and method would not be limited to the illustrated computer system.

It will be apparent to those skills in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply apparatus, comprising:
an input conversion stage, configured to receive an external AC power, and convert the external AC power to output a DC input voltage;
a standby power generation unit, coupled to the output of the input conversion stage, configured to convert the DC input voltage to generate and output a standby power;
a fast discharging unit, coupled to the standby power generation unit, configured to completely discharge the standby power within a first predetermined time when the external AC power is unavailable, so as to disable the standby power; and a main power conversion unit, coupled to the input conversion stage, configured to convert the DC input voltage to generate and output a set of main powers after the standby power is generated and when the power supply apparatus is in an operation phase, wherein the set of main powers is continuously maintained and outputted for more than a second predetermined time after the external AC power is unavailable.

2. The power supply apparatus according to claim 1, wherein the fast discharging unit comprises:

a first Zener diode, having a cathode configured to receive the standby power;

a second Zener diode, having a cathode coupled to an anode of the first Zener diode;

a first resistor, having a first terminal coupled to an anode of the second Zener diode, and a second terminal coupled to a ground potential;

a second resistor, having a first terminal coupled to the cathode of the first Zener diode;

a third resistor, having a first terminal coupled to the cathode of the first Zener diode;

a first bipolar-junction-transistor (BJT), having a base coupled to the first terminal of the first resistor, a collector coupled to a second terminal of the second resistor, and an emitter coupled to the ground potential; and a second BJT, having a base coupled to the second terminal of the second resistor, a collector coupled to a second terminal of the third resistor, and an emitter coupled the ground potential.

3. The power supply apparatus according to claim 2, wherein the fast discharging unit further comprises:

a first capacitor, having a first terminal coupled to the base of the first BJT, and a second terminal coupled to the ground potential; and a second capacitor, having a first terminal coupled to the base of the second BJT, and a second terminal coupled to the ground potential.

4. The power supply apparatus according to claim 2, wherein the first and the second BJTs are NPN-type BJTs.

5. The power supply apparatus according to claim 4, wherein the first BJT is conducting only when the standby power is established, and the second BJT is conducting only when the standby power is not established.

6. The power supply apparatus according to claim 2, wherein a resistance of the third resistor is substantially smaller than that of the second resistor.

7. The power supply apparatus according to claim 1, wherein the second predetermined time is smaller than the first predetermined time.

8. The power supply apparatus according to claim 1, wherein the power supply apparatus is a power supply apparatus capable of supporting an Advanced Technology eXtended (ATX) specification.

9. A power supply method, comprising:

converting an external AC power, so as to provide a DC input voltage;

converting the DC input voltage, so as to generate and output a standby power;

completely discharging the standby power within a first predetermined time when the external AC power is unavailable, so as to disable the standby power; and converting the DC input voltage to generate and provide a set of main powers after the standby power is generated and when the power supply apparatus is in an operation phase, wherein the set of main powers is continuously maintained and outputted for more than a second predetermined time after the external AC power is unavailable.

10. The power supply method according to claim 9, wherein the power supply method is at least applicable to a power supply apparatus capable of supporting an Advanced Technology eXtended (ATX) specification, and after the standby power is generated, the power supply method further comprises:

continuously converting the external AC power to keep providing the standby power when the power supply apparatus is not in the operation phase.

11. The power supply method according to claim 9, wherein after the set of main powers is generated, the power supply method further comprises:

determining whether the external AC power is unavailable;

if yes, completely discharging the standby power within the first predetermined time, so as to disable the standby power; and if no, continuously converting the external AC power, so as to keep providing the standby power and the set of main powers.

12. The power supply method according to claim 11, wherein after the standby power is disabled, the power supply method further comprises:

determining whether the external AC power is unavailable again;

if yes, continuously disabling the standby power; and if no, converting the external AC power again, so as to keep providing the standby power, and continuously determining whether the external AC power is unavailable again after the set of main powers is generated again, and thus determining whether to disable the standby power again.

13. The power supply method according to claim 9, wherein the second predetermined time is smaller than the first predetermined time.

14. A power supply apparatus, comprising:

a standby power generation unit, configured to convert a DC input voltage relating to an external AC power, so as to generate and output a standby power;

a fast discharging unit, coupled to the standby power generation unit, configured to completely discharge the standby power within a first predetermined time when the external AC power is unavailable, so as to disable the standby power; and a main power conversion unit, configured to convert the DC input voltage to generate and output a set of main powers after the standby power is generated and when the power supply apparatus is in an operation phase, wherein the set of main powers is continuously maintained and outputted for more than a second predetermined time after the external AC power is unavailable.

15. The power supply apparatus according to claim 14, wherein the fast discharging unit comprises:

a first Zener diode, having a cathode configured to receive the standby power;

a second Zener diode, having a cathode coupled to an anode of the first Zener diode;

a first resistor, having a first terminal coupled to an anode of the second Zener diode, and a second terminal coupled to a ground potential;

a second resistor, having a first terminal coupled to the cathode of the first Zener diode;

a third resistor, having a first terminal coupled to the cathode of the first Zener diode;

a first bipolar-junction-transistor (BJT), having a base coupled to the first terminal of the first resistor, a collector coupled to a second terminal of the second resistor, and an emitter coupled the ground potential;
a second BJT, having a base coupled to the second terminal of the second resistor, a collector coupled to a second terminal of the third resistor, and an emitter coupled the ground potential;
a first capacitor, having a first terminal coupled to the base of the first BJT, and a second terminal coupled to the ground potential; and
a second capacitor, having a first terminal coupled to the base of the second BJT, and a second terminal coupled to the ground potential.

16. The power supply apparatus according to claim 15, wherein the first and the second BJTs are NPN-type BJTs.

17. The power supply apparatus according to claim 16, wherein the first BJT is conducting only when the standby power is established, and the second BJT is conducting only when the standby power is not established.

18. The power supply apparatus according to claim 15, wherein a resistance of the third resistor is substantially smaller than that of the second resistor.

19. The power supply apparatus according to claim 14, further comprising:
an input conversion stage, coupled to the standby power generation unit and the main power conversion unit, and configured to receive the external AC power and convert the external AC power to output the DC input voltage.

20. The power supply apparatus according to claim 14, wherein the second predetermined time is smaller than the first predetermined time.

21. The power supply apparatus according to claim 14, wherein the power supply apparatus is a power supply apparatus capable of supporting an Advanced Technology eXtended (ATX) specification.

\* \* \* \* \*